(12) United States Patent
 Zaniboni

(10) Patent No.: US 12,012,240 B2
(45) Date of Patent: Jun. 18, 2024

(54) MACHINE AND METHOD FOR THE AUTOMATIC TREATMENT OF COMPONENTS OF INHALERS, IN PARTICULAR CARTOMIZERS FOR ELECTRONIC CIGARETTES

(71) Applicant: I.M.A. Industria Macchine Automatiche S.p.A., Ozzano dell'Emilia (IT)

(72) Inventor: Carlo Zaniboni, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 763 days.

(21) Appl. No.: 17/057,222

(22) PCT Filed: May 21, 2019

(86) PCT No.: PCT/EP2019/063117
§ 371 (c)(1),
(2) Date: Nov. 20, 2020

(87) PCT Pub. No.: WO2019/228866
PCT Pub. Date: Dec. 5, 2019

(65) Prior Publication Data
US 2021/0206520 A1 Jul. 8, 2021

(30) Foreign Application Priority Data
May 28, 2018 (IT) .................. 102018000005750

(51) Int. Cl.
*B65B 3/00* (2006.01)
*A24F 40/42* (2020.01)
(Continued)

(52) U.S. Cl.
CPC .............. *B65B 3/003* (2013.01); *A24F 40/42* (2020.01); *A24F 40/70* (2020.01); *B23P 21/004* (2013.01);
(Continued)

(58) Field of Classification Search
CPC .......... A24F 40/70; A24F 40/10; A24F 40/42; B65B 3/003; B65B 7/28; B65B 43/40; B23P 19/008; B23P 19/04; B23P 21/004
See application file for complete search history.

(56) References Cited

U.S. PATENT DOCUMENTS 5,711,137 A 1/1998 Moncrief et al.
9,789,572 B1 * 10/2017 Cheung ................. B23P 21/004
(Continued)

FOREIGN PATENT DOCUMENTS

CN 105666088 A 6/2016
EP 2538227 B1 2/2015
(Continued)

OTHER PUBLICATIONS

Int'l Search Report and Written Opinion issued Jul. 9, 2019 in Int'l Application No. PCT/EP2019/063117.

*Primary Examiner* — Matthew P Travers
(74) *Attorney, Agent, or Firm* — Panitch Schwarze Belisario & Nadel LLP

(57) ABSTRACT

Machine (10) and method for the automatic treatment of components of inhalers, in particular cartomizers for electronic cigarettes, wherein each component has a central body, preferably of tubular shape, having a lower end part normally protected by a removable lower cap and an upper end part normally protected by a removable upper cap. Upstream and downstream from one or more work stations (S3) and/or one or more inspection stations (S4) there are, respectively, a removal station (S2), configured to selec-
(Continued)

tively and automatically remove the caps from the respective central bodies, and a repositioning station (S5), configured to selectively and automatically return the caps to the corresponding central bodies of the components.

12 Claims, 10 Drawing Sheets

(51) Int. Cl.
*A24F 40/70* (2020.01)
*B23P 21/00* (2006.01)
*B65B 7/28* (2006.01)
*B65B 43/40* (2006.01)
*B65B 43/52* (2006.01)

(52) U.S. Cl.
CPC ................ *B65B 7/28* (2013.01); *B65B 43/40* (2013.01); *B65B 43/52* (2013.01)

(56) References Cited

U.S. PATENT DOCUMENTS

| | | | |
|---|---|---|---|
| 2012/0321516 A1* | 12/2012 | Schacher | ............... G01N 35/04 |
| | | | 53/381.1 |
| 2016/0295922 A1* | 10/2016 | John | ....................... A24F 40/46 |
| 2017/0311644 A1 | 11/2017 | Collett et al. | |

FOREIGN PATENT DOCUMENTS

| | | | |
|---|---|---|---|
| WO | 2015140768 A2 | 9/2015 | |
| WO | 2018078565 A1 | 5/2018 | |

* cited by examiner

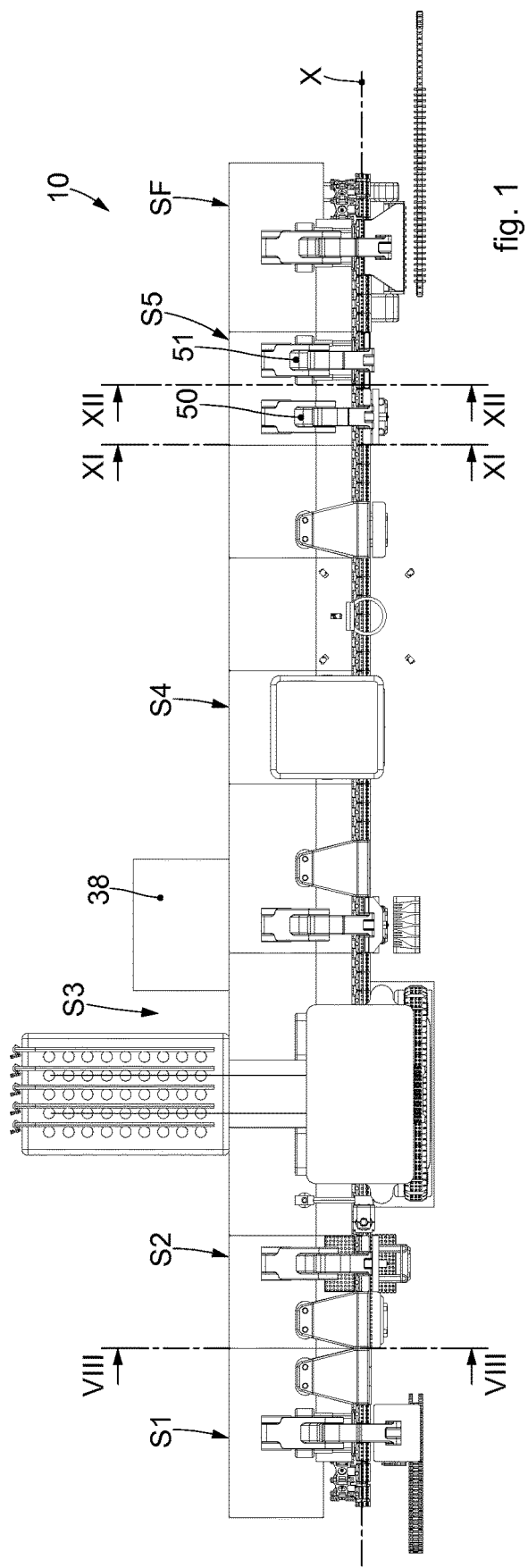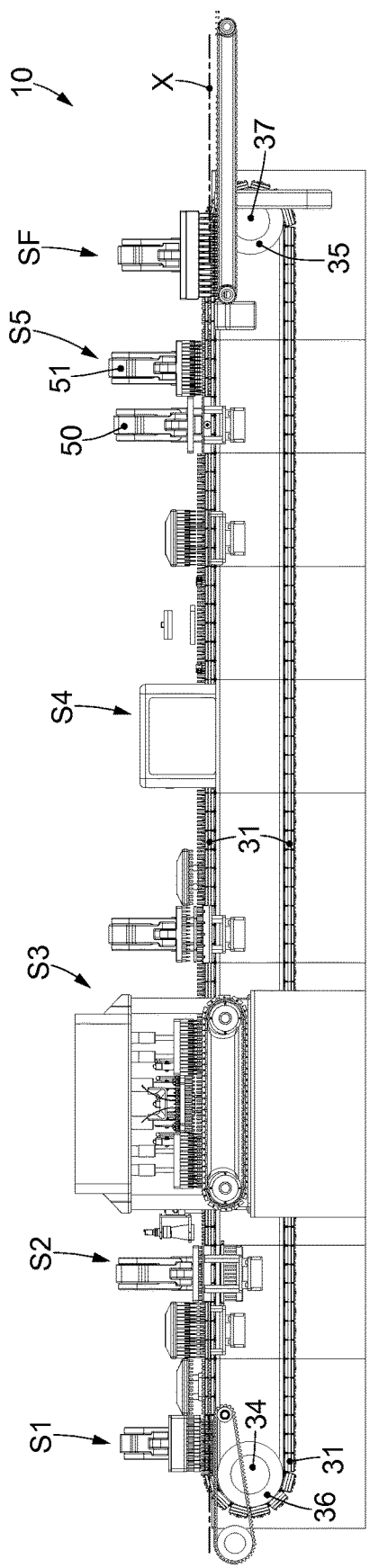

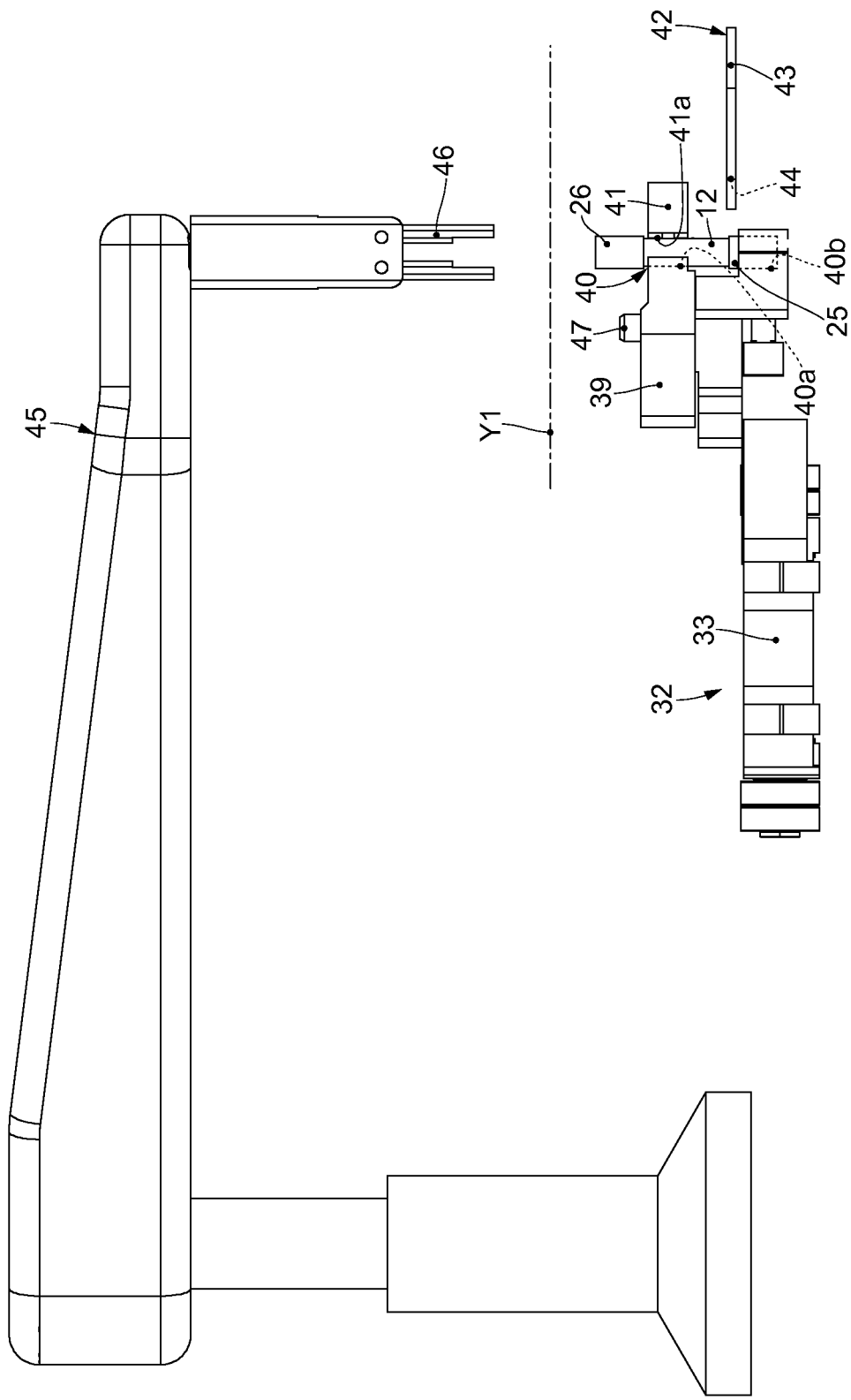

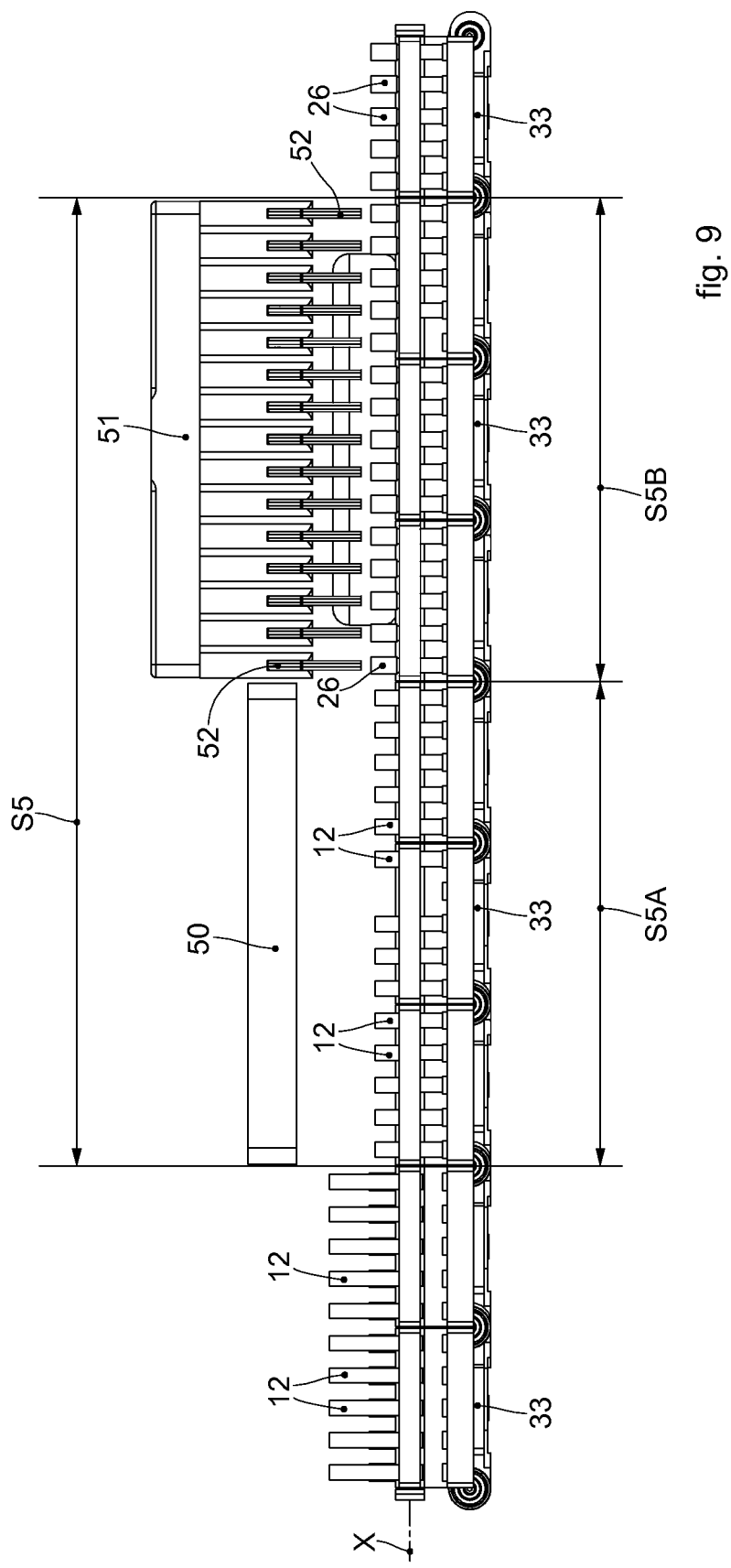

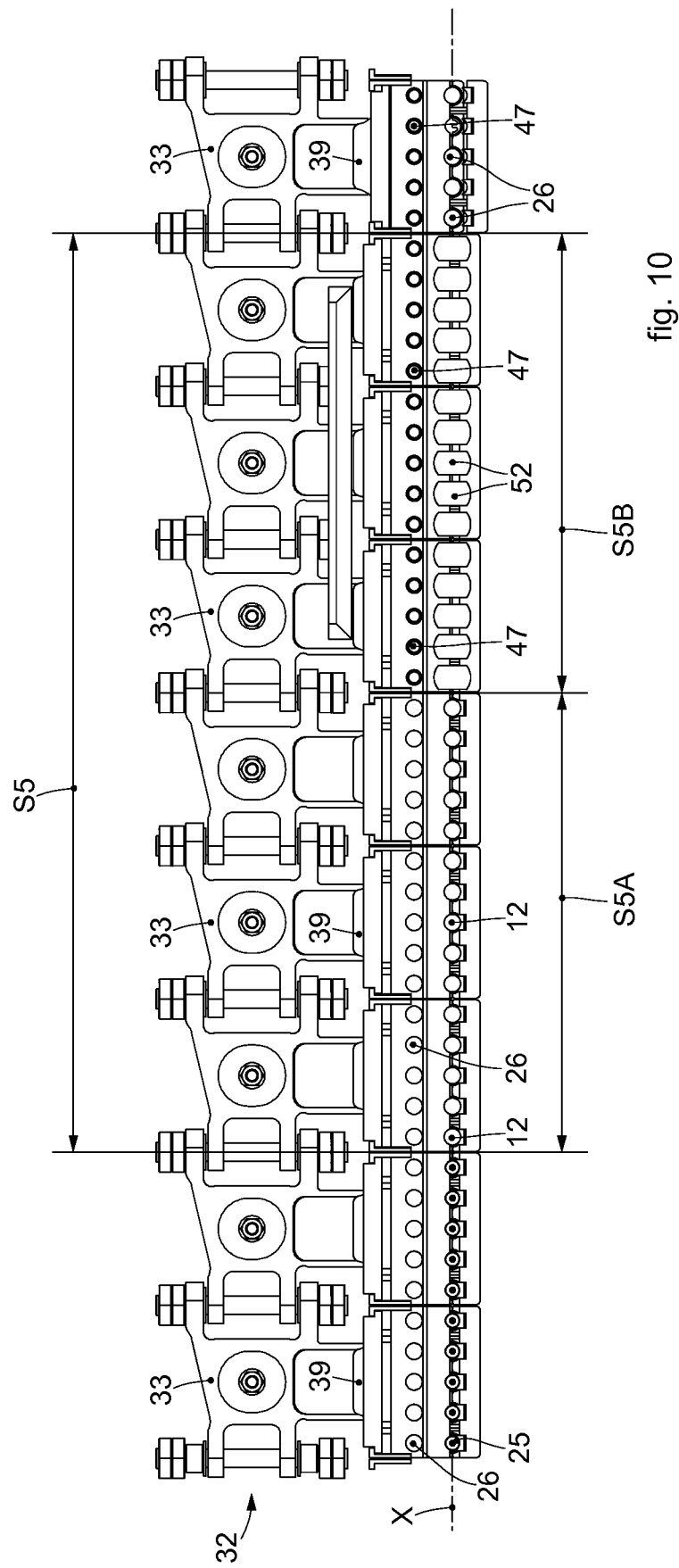

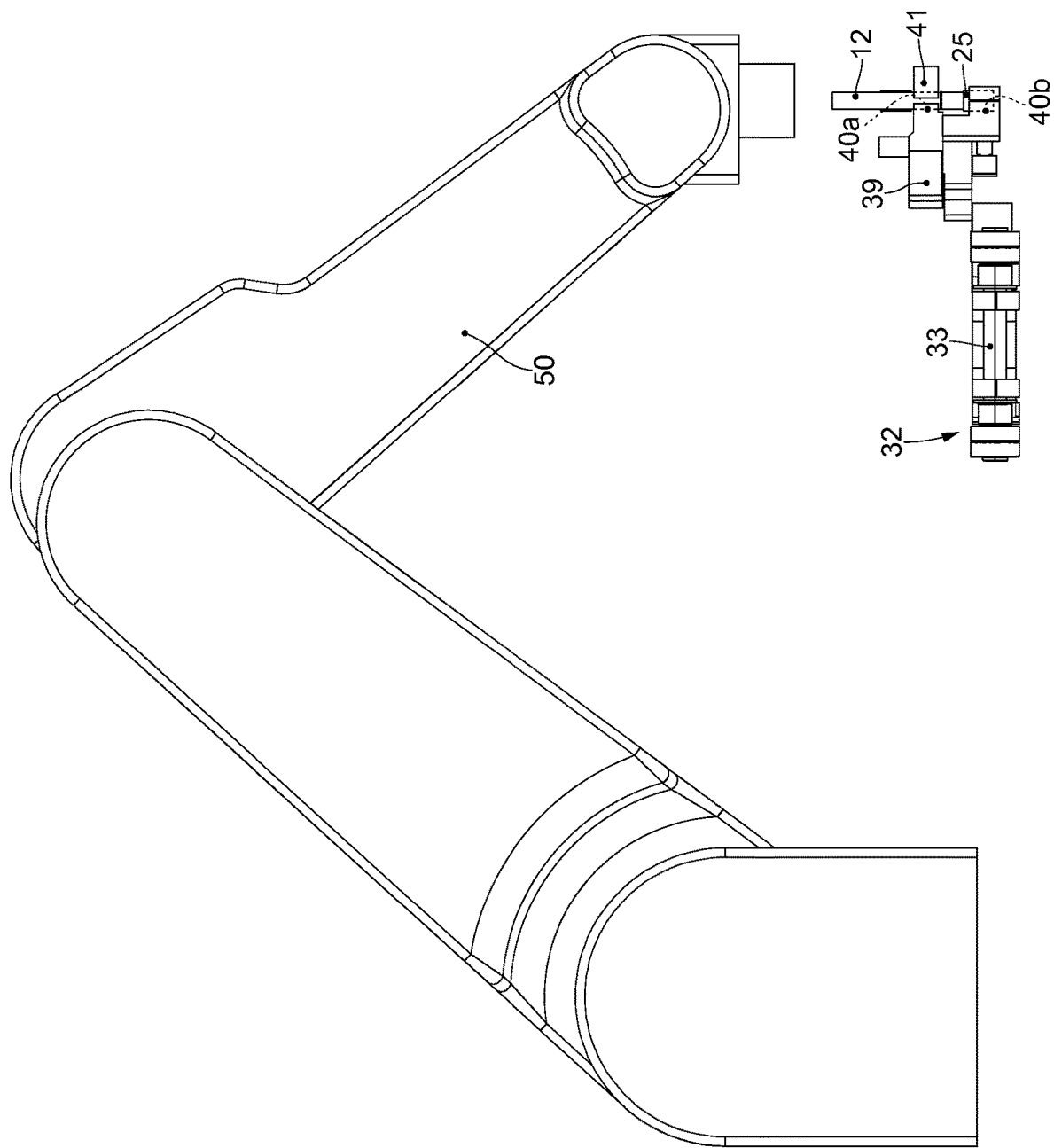

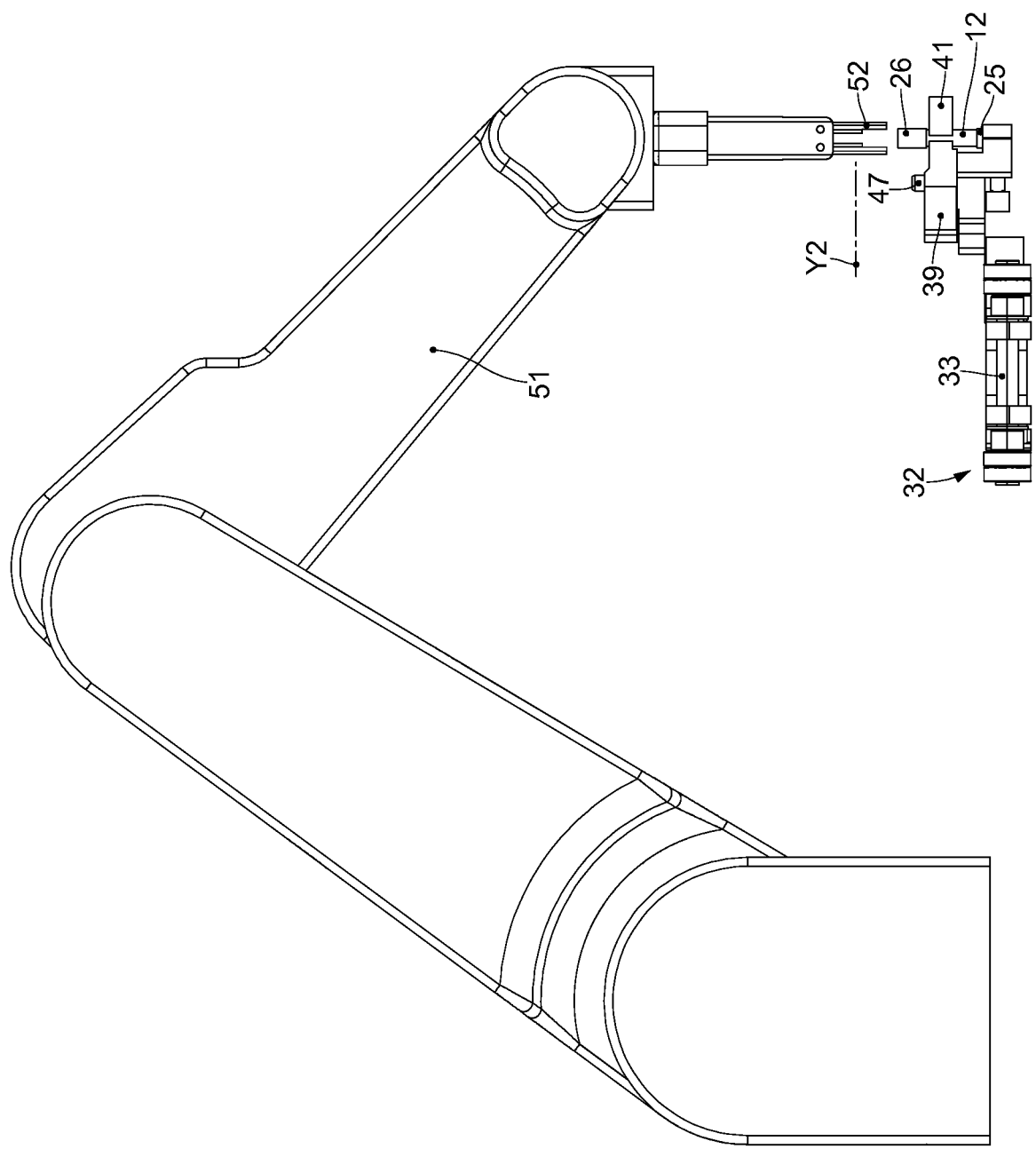

MACHINE AND METHOD FOR THE AUTOMATIC TREATMENT OF COMPONENTS OF INHALERS, IN PARTICULAR CARTOMIZERS FOR ELECTRONIC CIGARETTES

CROSS-REFERENCE TO RELATED APPLICATIONS

This application is a Section 371 of International Application No. PCT/EP2019/063117, filed May 21, 2019, which was published in the English language on Dec. 5, 2019, under International Publication No. WO 2019/228866 A1, which claims priority under 35 U.S.C. § 119(b) to Italian Application No. 102018000005750, filed May 28, 2018, the disclosures of each of which are incorporated herein by reference.

FIELD OF APPLICATION

The field of application of the present invention is that of machines and methods for the automatic treatment of components of inhalers, i.e. the application of one or more manufacturing steps and/or inspection steps to these components. In particular, but not exclusively, the above-mentioned components can be cartomizers for electronic cigarettes, i.e. objects each consisting of a cartridge containing an atomizer that can transform the liquid it contains into vapour by means of a heating element, for example an electrical resistance.

STATE OF THE ART

In the field of inhalers in general and electronic cigarettes in particular, one of the components that attracts particular attention from the manufacturers of such products is the so-called cartomizer, i.e. a cartridge of substantially tubular shape that contains an atomizer that is able to selectively transform into vapour a particular liquid that is also contained by that same cartridge.

In the case of electronic cigarettes the size of a single cartridge is substantially equivalent to the size of a regular tobacco cigarette, for example having a length of approximately 60 mm and an external diameter of approximately 9 mm and an outward surface with a tactile and aesthetic finish appreciable by the user.

Furthermore each cartridge has both ends provided with openings, through which it is possible to access at the elements contained by the cartridge, for example a small reservoir for the liquid that is to be vaporized and the electric and electronic parts of the atomizer.

One of the technical problems that designers of machines for the automatic treatment of said components have to face and solve is the mechanical handling of the components without any damage, not even slightly, on the external cylindrical surface of each component.

Another technical problem is that of the high productivity demanded from a machine for the automatic treatment of said components, so that the production cost of each single component is sufficiently low to make the component competitive in the market. By way of example, a target value for said productivity could be 1,000 components to be treated per minute, which means that the machine must be able to automatically treat a component approximately every 6 hundredths of a second.

There is a need, therefore, to improve and provide a machine and a method for the automatic treatment of components of inhalers, in particular cartomizers for electronic cigarettes, that overcomes at least one of the drawbacks from the prior art.

In particular, one of the goals of the present invention is therefore to provide a machine and a related method for the automatic treatment of components of inhalers, in particular, but not only, cartomizers for electronic cigarettes, which, overcoming the drawbacks of the prior art, is fast and reliable and allows for the execution of all the manufacturing and/or inspection operations without damaging the treated components, including their external surface.

Another goal of the present invention is to provide a machine and a related method for the automatic treatment of components of inhalers, in particular but not restricted to cartomizers for electronic cigarettes, that also has a high level of productivity, in the order of 1,000 inhalers treated per minute.

To overcome the drawbacks of the prior art and to obtain these and other goals and advantages, the Applicant has studied, experimented and created the machine and has set up the injecting method in accordance with the present invention.

SUMMARY OF THE INVENTION

The present invention is described and characterized in the independent claims, whereas the dependent claims present other characteristics of the present invention, or variants on the main solution idea.

In accordance with the goals described above, the following embodiments refer to a machine for the automatic treatment of components of inhalers, in particular cartomizers for electronic cigarettes. Typically each component that is to be treated by this machine comprises a central body, preferably of a tubular shape, having a lower end part normally protected by a removable lower cap, and an upper end part normally protected by a removable upper cap. The above-mentioned machine comprises a loading station configured for loading the components to be treated onto a transporting member, a final station configured to unload the treated components from the transporting member and one or more work stations and/or one or more inspection stations of the components, located between the loading station and the final station.

In accordance with one embodiment, after said loading station and upstream of said one or more work stations and/or one or more inspection station a removal station is disposed that is configured to selectively and automatically remove the caps to be treated from their respective central bodies. Moreover, before said final station a repositioning station is disposed that is configured to selectively and automatically reposition the treated caps on the lower and upper end respectively of the corresponding central body of each component.

In accordance with further embodiments, said loading station, said removal station, said one or more work stations and/or one or more inspection stations, said repositioning station and said final station are disposed side by side along a longitudinal axis. Furthermore, said transporting member comprises a chain disposed along said longitudinal axis and configured to selectively transport the components from said loading station to said final station, passing through the other stations.

In accordance with further embodiments, said removal station comprises both first gripping and positioning means, configured to perform a first lifting of the upper cap of each of the components that are to be treated together with the corresponding central body, until they are taken together to a first height, which is higher than the height of the lower cap, and also first temporary clamping means configured to selectively and temporarily hold each lower cap in its initial position, at least while said first gripping and positioning means perform said first lifting.

In accordance with further embodiments, said first gripping and positioning means are also configured to perform a second lifting of each upper cap to take it to a second height, which is greater than the sum of said first height and the height of the lower cap. Moreover, second temporary clamping means are present in said removal station to temporarily hold each central body in a stationary raised position at said first height, at least while said first gripping and positioning means perform said second lifting.

In accordance with further embodiments, said first gripping and positioning means are also configured to laterally move each upper cap already removed from its central body and to deposit it on temporary support means.

In accordance with further embodiments said transporting member comprises at least one slider having at least one vertical seat configured to accommodate at least said lower end part of the central body and the corresponding lower cap; moreover said temporary support means is advantageously disposed on an upper part of said slider.

In accordance with further embodiments, said repositioning station comprises pushing means configured to cooperate with said central body after it has been subjected to work or inspection operations in said one or more work stations and/or one or more inspection stations, to insert said central body from above into the corresponding lower cap, which is positioned below it.

In accordance with further embodiments, said repositioning station comprises second gripping and positioning means configured to reposition each upper cap to its initial position, covering said upper end part of the central body.

In accordance with further embodiments, said second gripping and positioning means are configured to remove each upper cap from said temporary support means and to position it in said initial covering position.

Further embodiments described hereinafter refer to a method for the automatic treatment of components for inhalers, in particular cartomizers for electronic cigarettes. Typically each component comprises a central body, preferably of a tubular shape, having a lower end part normally protected by a removable lower cap and an upper end part normally protected by a removable upper cap. In accordance with one embodiment, said method comprises a loading step, wherein said components are loaded onto a transporting member able to transport them first to one or more work stations and/or one or more inspection stations of said components, and then from these to a final station, as well as an automatic removal step of said caps from the respective central bodies of the components, before said central bodies are transferred to said one or more work stations and/or said one or more inspection stations, and also an automatic repositioning step of said caps on the lower end part and upper end part respectively of the central body of each of said components before each central body is transferred from said one or more work stations and/or said one or more inspection stations toward said final station.

These and other aspects, characteristics, and advantages of the present disclosure will be better understood with reference to the following description, figures and enclosed claims. The figures, which are an integral part of the present description, illustrate some embodiments of the present invention and, together with the description, are intended to describe the main principles of this disclosure.

The various aspects and characteristics described in the present description can be applied individually, where possible. These individual aspects, for example aspects and characteristics present in the description or in the enclosed dependent claims, may become the subject of divisional applications.

DESCRIPTION OF THE DRAWINGS

These and other characteristics of the present invention will become clear in the following description of a preferred embodiment, provided solely as non-limiting example, with reference to the enclosed drawings, wherein:

FIG. 1 is a schematic top view of a machine for the automatic treatment of cartomizers for electronic cigarettes according to the present invention;

FIG. 2 is a schematic front view of the machine of FIG. 1;

FIG. 8 is a cross section along the line VIII-VIII of FIG. 1;

FIG. 9 is a front view of a second enlarged detail of the machine of FIG. 1;

FIG. 10 is a top view of the detail of FIG. 9;

FIG. 11 is a cross section along the line XI-XI of FIG. 1;

FIG. 12 is a cross section along the line XII-XII of FIG. 1;

For ease of understanding identical reference numbers have been used where possible to identify common elements in the figures. It should be understood that elements and characteristics of one embodiment can conveniently be incorporated in other embodiments without further specifications.

It is pointed out that in the present description and in the claims the terms top, bottom, vertical, horizontal, upper, lower, internal, and external and variations thereon only serve to better illustrate the present invention with reference to the figures, and should not be used in any way to limit the scope of the invention itself or the scope of protection as defined by the claims. For example, the term horizontal indicates a plane that can be either parallel to the horizon, or at an inclined angle, also by a substantial degree, to said horizon.

DESCRIPTION OF EMBODIMENTS

Reference will now be made in detail to the various embodiments of the invention, of which one or more examples are illustrated in the enclosed figures. Each example is provided as an illustration of the invention and should not be interpreted as a limitation thereof. For example, the illustrated or described characteristics of one embodiment can be adapted to or associated with other embodiments in order to create a further embodiment. This means that the present invention comprises all those modifications and variations.

Before describing the embodiments, it is further pointed out that the present description is not limited in its application to details related to the construction or lay-out of the components as described in the following description, using the enclosed figures. The present description can include other embodiments and can be realised or put into practice in various other ways. Furthermore it is pointed out that the phrasing and terminology are used here for descriptive purposes, and should not be taken as limitative.

Figure 3:
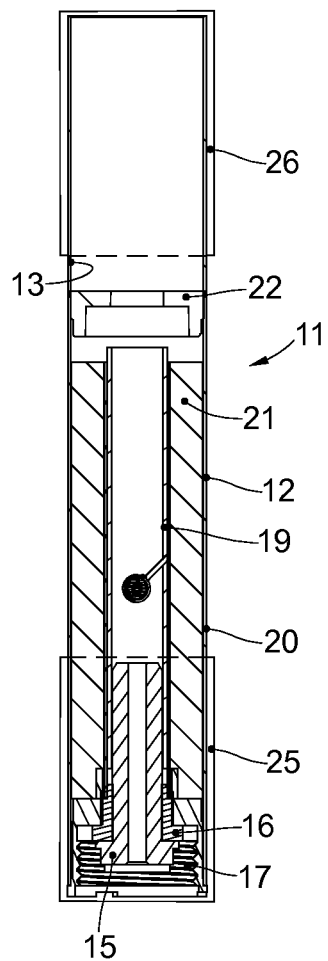
FIG. 3 is a schematic cross-section view of a cartomizer to be treated by the machine of FIG. 1.

With reference to FIGS. 1 and 2, embodiments are described of a machine 10 for the automatic treatment of components of inhalers, for example cartomizers 11 (FIGS. 3 and 4) for electronic cigarettes. The machine 10, in some embodiments, comprises a series of work stations from S1 (FIGS. 1 and 2) to SF, as will be described in detail below, which are disposed side by side along a longitudinal axis X and configured to each perform one or more work and/or inspection steps on said cartomizers 11.

It is pointed out that the number of work stations of the machine 10 varies depending on the various work and/or inspection steps be performed on the components of inhalers, and it is therefore not a limitation of the scope of protection of the present invention.

To better understand the inventive concept of the present invention, before describing in detail the machine 10 and the related method, an example of the construction of a cartomizer 11 (FIGS. 3 and 4) will be described first, without prejudice to the fact that the present invention is not limited to this example, but that it can be used for the automatic treatment of components of inhalers that are already known or that will be developed in the future.

By way of example a cartomizer 11 comprises a central body 12 of tubular shape, having an internal cavity 13 that is open at both ends and that has an external surface 14, treated in a known manner for being pleasant both to touch and the aesthetic look. In the example given here, the cartomizer 11 has a length of approximately 60 mm and an external diameter of approximately 9 mm, and the thickness of the cylindrical wall of the central body 12 is approximately 0.2 mm.

Figure 4:
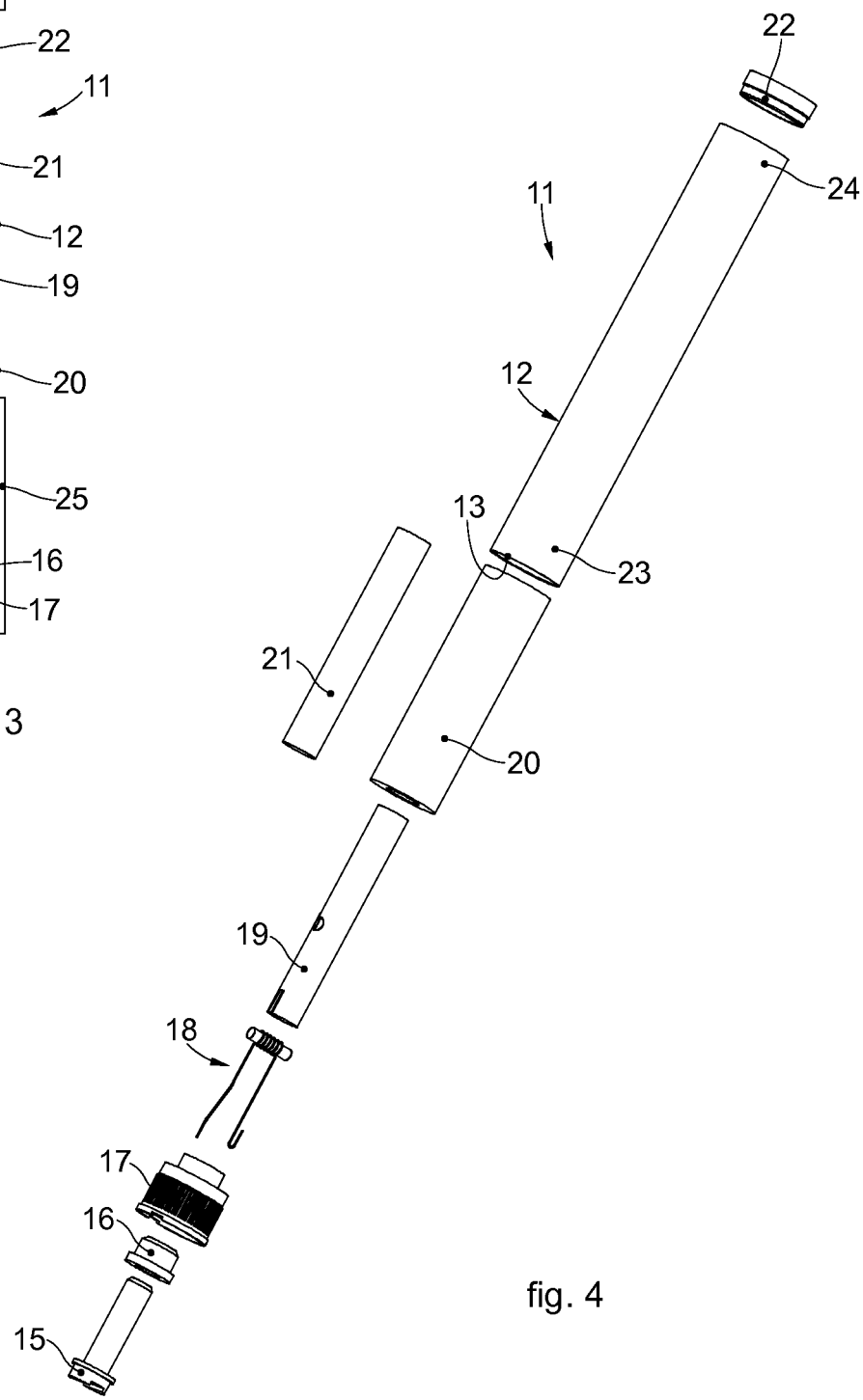
FIG. 4 is an exploded view of the elements that make up the cartomizer of FIG. 3.

In the lower part of the cavity 13 there are—from the bottom to the top in FIG. 4—a metal ring 15 that functions as electrode, a ring of isolating material 16, a cap 17, hollow on the inside and threaded on the outside, and a heating unit 18 connected to the metallic ring 15. Furthermore, around a heating unit 18 a tubular element 19 made of glass fibre is arranged. Coaxial with the latter and against the internal wall of the cavity 13 a bushing 20 made of a plastic material, e.g. polyester, is arranged. In the annular space between the tubular element 19 and the bushing 20 a cotton felted cloth 21 is arranged, which is configured to be imbued with a specific liquid, for example containing natural or artificial essences, and/or some other substance, destined to be vapourized during the selective activation of the heating unit 18. A blocking ring 22 is intended to be arranged over the felted cloth 21 after the latter has been imbued with liquid.

The upper part of the cavity 13 is empty for a depth of approximately 8-9 mm and is configured to potentially accommodate a tobacco capsule, or another substance that is suitable to provide a specific flavour to the vapour that the user inhales by drawing air through the upper end of the cartomizer 11.

Each cartomizer 11, during its transport and packaging, or until it is used by the end user, is conveniently protected in such a manner that at least its lower end part 23, i.e. the part near the metal ring 15, and the upper end part 24, i.e. at the upper part of the cavity 13, are protected from any undesirable contact, impact or damage.

To provide this protection, each cartomizer 11 is for example closed at the bottom end by a lower cap 25 (FIGS. 3 and 5a) and at the top end by an upper cap 26. The caps 25 and 26 are made of a soft and transparent material, for example silicone, and can be attached, removed, and reattached. The height of each cap 25 and 26 is, for example, approximately 15 mm.

Figure 6:
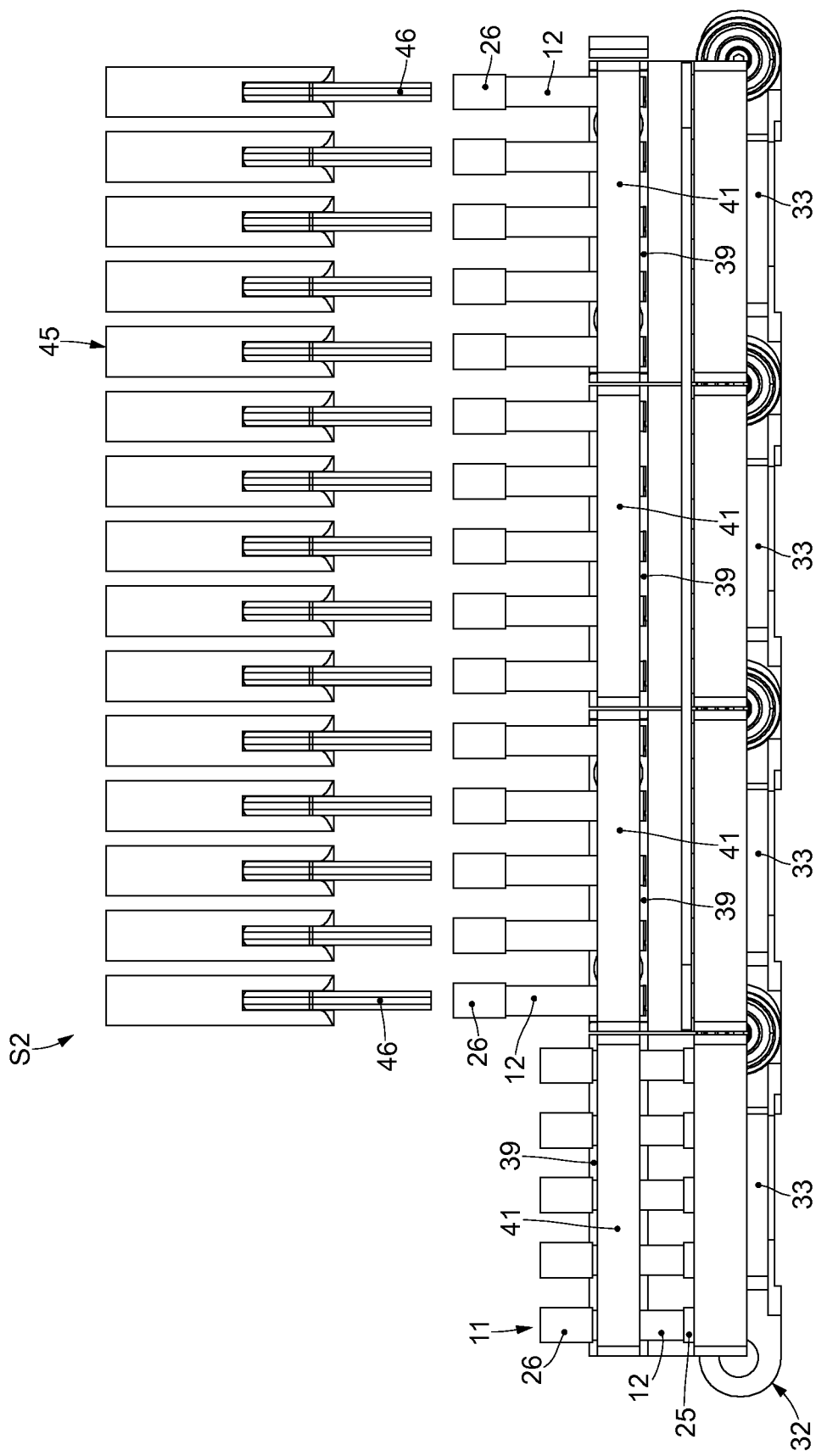
FIG. 6 is a front view of a first enlarged detail of the machine of FIG. 1.

The machine 10 (FIGS. 1 and 2) comprises a loading station 51 wherein a plurality of cartomizers 11, including the protective caps 25 and 26 (FIG. 6), can be loaded, preferably in an automatic manner, onto a transporting member 31, for example already aligned vertically one behind the other, in the right direction, i.e. with the upper empty part of the cavity 13 turned upwards, in order to be transported along the longitudinal axis X (FIGS. 1 and 2) towards other work stations and/or inspection stations until arriving at a final station SF, in which the cartomizers 11, including the protective caps 25 and 26, are unloaded automatically and subsequently transported to be packaged.

In the example given here, the transporting member 31 comprises a chain 32 (FIG. 6) made of articulated links 33 that stretches between two toothed wheels 34 and 35 (FIGS. 1 and 2), arranged on a vertical plane that passes through the longitudinal axis X; each toothed wheel is attached to a corresponding electric motor 36 and 37, schematically rendered in FIG. 2.

A central control unit 38, schematically rendered in FIG. 1, is configured to control and send commands to, among other things, the two motors 36 and 37, so that the chain 32 advances in a stepped manner, i.e. at specific increments, and selectively carries the cartomizers 11 from the loading station 11 to the final station SF, as will be described in detail below.

In some embodiments, a removal station S2 is arranged after said loading station S1 along the longitudinal axis X, and it is configured for the selective and automatic removal of the caps 25 and 26 from the respective central bodies 12 of the cartomizers 11, so that each central body 12 can be manipulated and treated in the subsequent work and/or inspection operations, with its ends open.

In particular, this removal station S2 is arranged along the longitudinal axis X immediately downstream from the loading station S1.

In some embodiments, this removal station S2 is furthermore arranged upstream, along the longitudinal axis X, of one or more work stations S3 and/or inspection stations S4 of the cartomizers 11.

In particular, in some embodiments, one or more work stations S3 are arranged immediately downstream from the removal station S2 along the longitudinal axis X, for example a filling station that is configured to fill the cartomizers with the above-mentioned liquid, through the upper opening of the cavity 13, and/or one or more inspection stations S4, for example an electric inspection station configured to test the correct functioning of the heating unit 18 through the lower opening of the cavity 13. Other work stations and/or inspection stations can be included in the machine 10, without departing from the scope of protection of the present invention.

Along the longitudinal axis X, downstream from the inspection station S4 and any other work and/or inspection stations but before the final station SF, a repositioning station S5 is arranged that is configured to reposition the protective caps 25 and 26 onto the central bodies 12 of the cartomizers 11, so that each cartomizer 11 is returned to its original protective state before being packaged.

Figure 7:
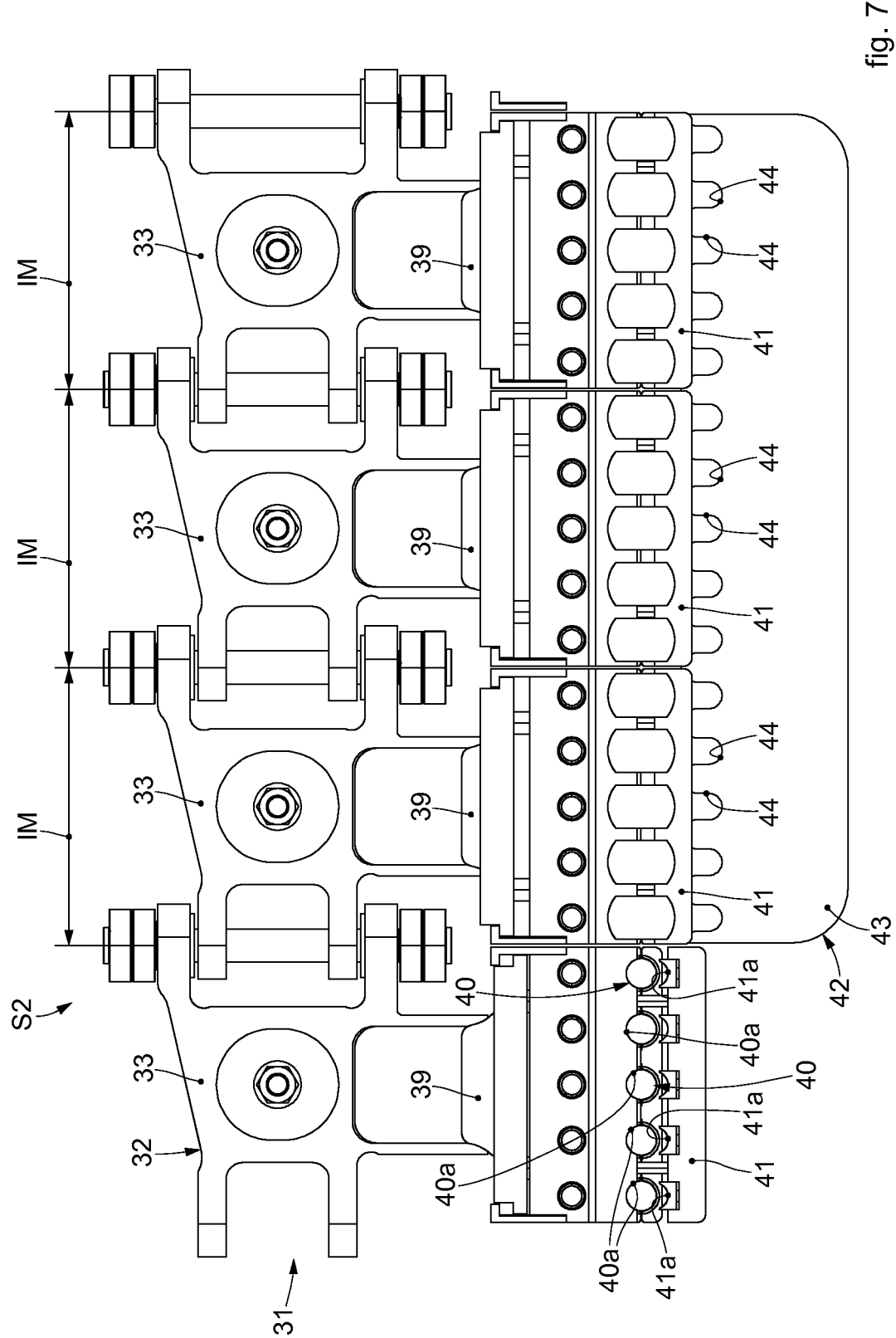
FIG. 7 is a top view of the detail of FIG. 6.

In the embodiment represented here, attached to each link 33 of the chain 32 there is a slider 39 (FIGS. 6, 7 and 8), which has five vertical seats 40 (FIGS. 7 and 8), each of which is suited to receive a cartomizer 11 comprising, initially, the protective caps 25 and 26. By way of example, the interaxis between two adjacent vertical seats 40 is approximately 19 mm. Therefore, the length of each slider 39, in the direction of the longitudinal axis X, which corresponds to the interaxis IM between the links 33, is approximately 95 mm.

In the example given here each seat 40 (FIG. 8) comprises a semi-cylindrical upper part 40a, suitable to cooperate with a central body 12, and a cylindrical lower part 40b, suitable to accommodate the corresponding lower cap 26.

Onto each slider 39 also a gripping device 41 is attached, which is shaped to have five semi-cylindrical recesses 41a, opposite and mirroring the group of five upper parts 40a, to selectively and contemporaneously grip in the desired position the corresponding five central bodies 12, under the control of the central control unit 38, as will be described in detail below.

In particular, the removal station S2 for the removal of the caps 25 and 26 from the central bodies 12 of the cartomizers 11, in the example provided here, is configured to treat fifteen cartomizers 11 at the same time, i.e. the number of cartomizers supported by three adjacent sliders 39 (those on the right in FIGS. 6 and 7) and it comprises a temporary clamping device 42, having a horizontal comb-like element 43 having, on the side facing the vertical seats 40, recesses 44 whose interaxes is equal to the one of said vertical seats 40, and each recess 44 has a width that is slightly greater than the external diameter of the central body 12, but smaller than the external diameter of the lower cap 25.

The removal station S2 also comprises a first gripping and positioning device 45, for example of the type known to the skilled in the art as "pick and place", or "P&P", which has fifteen grippers 46 that are selectively operable, under the control of the central control unit 38, both for lifting and lowering all at the same time, and for gripping each upper cap 26, with or without the associated central body 12 of a corresponding cartomizer 11, as will be described in detail below.

The first gripping and positioning device 45 is also configured to contemporaneously transport fifteen upper caps 26, after having been lifted and removed from the central bodies 12, along a first transverse axis Y1, substantially horizontal, and to lower them onto fifteen corresponding vertical pegs 47 with a cylindrical shape, mounted on the upper part of the slider 39, each peg 47 having an external diameter slightly smaller than the internal diameter of each upper cap 26.

The repositioning station S5 (FIGS. 9 to 12) for the repositioning of the caps 25 and 26 on the central bodies 12 of the cartomizers 11 is subdivided into two parts placed side by side along the longitudinal axis X, namely a first part S5A, nearest to the inspection station S4 and configured to insert fifteen tubular bodies 12 at once into fifteen corresponding lower caps 25, and a second part S5B, nearest to the final station SF and configured to then insert fifteen upper caps 26 at once into the fifteen corresponding tubular bodies 12 that have already been inserted into the lower caps 25.

In the embodiment described here, the first part S5A comprises pushing means 50 (FIG. 11), configured to selectively push down, under the control of the central control unit 38, the fifteen tubular bodies 12 carried by the sliders 39 and located underneath it, to insert them thus into the corresponding lower caps 25 that are positioned in the corresponding lower parts 40b of the vertical seats 40.

The second part S5B instead comprises a second gripping and positioning device 51, also of the P&P type, which is provided with fifteen selectively operable grippers 52, operated under the control of the central control unit 38, to grip fifteen upper caps 26 positioned onto the vertical pegs 47 in order to remove them from the pegs 47, lift them, and then transport the upper caps 26 along a second transverse axis Y2 that is parallel to the first transverse axis Y1, until they reach the fifteen central bodies 12 and then insert these by lowering them covering the upper end parts 24 of the central bodies 12, as will be described in detail below.

The functionality of the machine 10 described here, which is also the method for the automatic treatment of components of inhalers, in particular the cartomizers 11 for electronic cigarettes, is as follows.

In a first operational stage, also known as the loading stage, the cartomizers 11 to be treated and/or inspected, including the caps 25 and 26, are placed in the loading station S1 (FIGS. 1 and 2), for example automatically by means of robot means of the known kind, controlled by said control unit 38. In particular each cartomizer 11 is positioned vertically in a corresponding vertical seat 40, with the lower cap 25 inside the lower part 40b of the latter.

In a second operational stage, also known as the transfer stage, the electric motors 36 and 37 receive commands from the central control unit 38 in order to have the chain 32 (FIG. 7) perform a swift incremental advancement AI equal in length to the size of three adjacent sliders 39, i.e. approximately 285 mm, to carry fifteen cartomizers 11, i.e. five for each of the three sliders 39, from the loading station S1 to the removal station S2.

By way of example the speed of advancement V of the chain 32 is very high, so that each incremental advance AI is carried out very rapidly for each time interval T, which in the example given here is approximately 0.9 seconds, in order to obtain a productivity for the machine 10 that is around 1,000 cartomizers 11 per hour.

In a third operational stage, also known as the removal stage, first the lower caps 25 and then the upper caps 26 are removed from the corresponding central bodies 12 of each of the fifteen cartomizers 11 present in the removal station S2.

Figure 5:
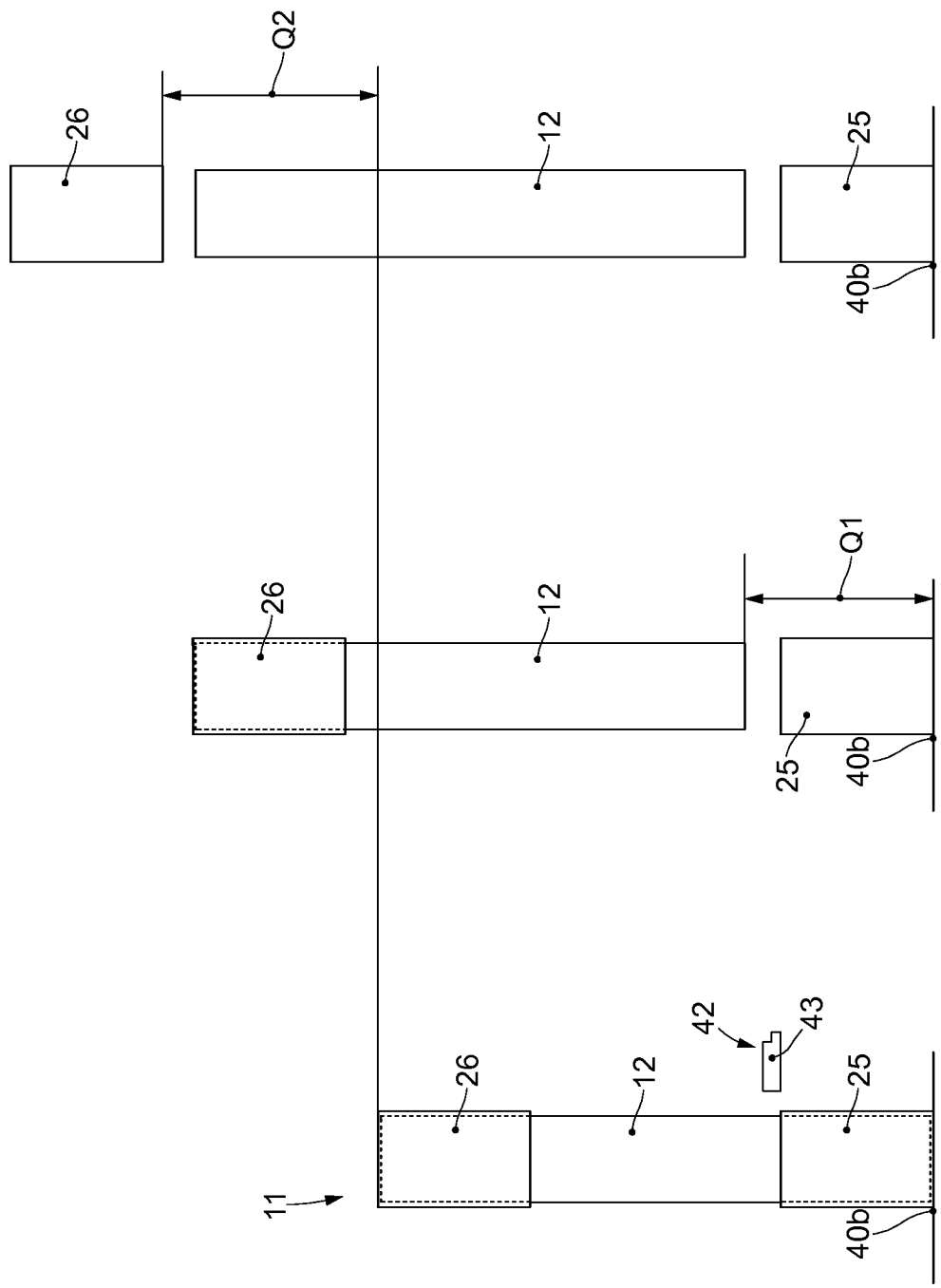
FIGS. 5a, 5b and 5c schematically show the relative position of the central body and related protective caps of the cartomizer of FIG. 3 during the operational step of being removed.

In particular, the central control unit 38 first sends a command to the temporary clamping device 42 (FIGS. 7 and 8) so that the fifteen lower caps 25 are held in their initial positions at the bottom of the corresponding lower parts 40b (FIG. 5a) of the vertical seats 40 and at the same time it distances the gripping device 41 (FIGS. 7 and 8) from the upper parts 40a of the vertical seats 40. Then the central control unit 38 sends a command to the first gripping and positioning device 45 so that it contemporaneously grips with grippers 46 the fifteen upper caps 26 and lifts them together with the central bodies 12 to a first height Q1 (FIG. 5b), which is higher than the height of the lower caps 25, in other words until said central bodies 12, still with their upper caps 26, are completely removed from the lower caps 25. Immediately after this the central control unit 38 activates the gripping device 41 and blocks the fifteen central bodies 12 in the upper parts 40a of the vertical seats 40. The first gripping and positioning device 45 then lifts the fifteen upper caps 26, lifting them still further from their initial position to a second height Q2 (FIG. 5c), thus removing them completely from the corresponding central bodies 12 that remain stationary at the first height Q1 (FIG. 5b).

Subsequently the central control unit 38 sends a command to the first gripping and positioning device 45 so that the fifteen upper caps 26 that have just been removed, are positioned, in other words temporarily parked, on the vertical pegs 47 by moving them along the first transverse axis Y1 and then lowering them.

In the course of the third operational stage, other cartomizers 11 to be treated and/or inspected, including the caps 25 and 26, are placed in the loading station S1.

In a fourth operational stage, also a transfer stage, the electric motors 36 and 37 receive commands from the central control unit 38 to make the chain 32 perform further incremental advances AI to carry the fifteen central bodies without the caps 25 and 26 from the removal station S2 to the work station S3, as a new group of fifteen cartomizers 11 passes with each incremental advance AI from the loading station S1 to the removal station S2.

Then one or more work and/or inspection stages follow, during which the desired operations are performed on the groups of fifteen central bodies 12 without the caps 25 and 26, for example the filling of the felted cloths 21 with a liquid, and/or desired tests are performed.

Associated with each work and/or inspection stage there is a further transfer stage, analogous to the one described above, in order to transport, with incremental advances AI, the central bodies 12 from the work station S3 to a possible other work station, or to any of the control stations S4 and from the last of these to the repositioning station S5 for the repositioning of the caps 25 and 26 on the central bodies 12.

Thus a repositioning stage follows, during which first the group of fifteen central bodies 12 is contemporaneously repositioned with their lower end parts 23 in the lower caps 25, which are positioned on the lower parts 40b of the vertical seats 40, after the operation by the pushing device 50 (FIGS. 9 and 11). Then the upper caps 26 are repositioned onto the central bodies 12 in an operation performed by the second gripping and positioning device 51.

In particular, the central control unit 38 sends commands to the second gripping and positioning device 51 to first lift with its grippers 52 the upper caps 26 from the vertical pegs 47, where they have been parked temporarily, and place them to cover the upper end parts 24 of the central bodies 12, transporting them with a lifting movement along the second transverse axis Y2 and then lowering them.

In a last operational stage, also a transfer stage, the cartomizers 11, finished and/or inspected, and also having their protective caps 25 and 26 again, are transferred in a manner analogous to the previously described transfers, from the repositioning station S5 to the final station SF, where they are then unloaded and sent on to be packaged.

It will be clear that modifications and/or additional parts and/or stages can be added to the machine 10 and the related method described here, without however going beyond the scope of protection of the present invention.

It will also be clear that even though the present invention is described with reference to a specific example of an embodiment, a person skilled in the art can certainly realize many other equivalent forms of the machine and/or method for the automatic treatment of components of inhalers, in particular cartomizers for electronic cigarettes, having the characteristics as defined in the enclosed claims and therefore falling within the scope of protection as defined by these claims.

In the following claims the purpose of the references in parentheses is to facilitate reading and they should not be considered limiting factors where the scope of protection as defined by the specific claims is concerned.

The invention claimed is:

1. A machine for automatic treatment of components of inhalers, wherein each component comprises a central body of a tubular shape and having a lower end part normally protected by a removable lower cap and an upper end part normally protected by a removable upper cap, said machine comprising a loading station configured to load said components on a transporting member, an unloading station configured to unload said components from said transporting member, a controller, and one or more work stations and/or one or more inspection stations, interposed between said loading station and said unloading station, wherein a removal station is disposed downstream of said loading station and upstream of said one or more work stations and/or one or more inspection stations and a repositioning station is disposed downstream of said one or more work stations and/or one or more inspection stations and upstream of said unloading station, wherein the controller is configured to control the removal station to remove said removable lower and upper caps from the central bodies of said components, and also configured to control the repositioning station to reposition, respectively, the removed lower and upper caps at the lower and upper end part of the central bodies of each of said components.

2. The machine as in claim 1, wherein said loading station, said removal station, said one or more work stations and/or one or more inspection stations, said repositioning station and said unloading station are disposed side by side along a longitudinal axis and said transporting member comprises a chain disposed along said longitudinal axis and configured to selectively transport said components from said loading station to said unloading station, passing through said removal station, said one or more work stations and/or one or more inspection stations and said repositioning station.

3. The machine as in claim 1, wherein said removal station comprises a first gripping and positioning member configured to lift the upper cap together with the corresponding central body and a first clamping member configured to hold said lower cap at least until said first gripping and positioning member removes said central body from the lower cap.

4. The machine as in claim 3, wherein said first gripping and positioning member is further configured to lift said upper cap, and wherein a second clamping member is configured to hold said central body, with the lower cap already removed, in a stationary position until said first gripping and positioning member removes said upper cap from the central body.

5. The machine as in claim 4, wherein said first gripping and positioning member is further configured to deposit the removed upper cap on a temporary support element.

6. The machine as in claim 5, wherein said transporting member comprises at least one slider having at least one vertical seat configured to house at least said lower end part of said central body and the corresponding lower cap and wherein said temporary support element is disposed on an upper part of said slider.

7. The machine as in claim 3, wherein said repositioning station further comprises a second gripping and positioning member configured to reposition said upper cap to said upper end part of said central body.

8. The machine as in claim 7, wherein said second gripping and positioning member is further configured to pick up said upper cap from a temporary support element.

9. The machine as in claim 1, wherein said repositioning station comprises pushing elements configured to push said central body into the lower cap, after said central body has been subjected to work and/or inspection operations in said one or more work stations and/or one or more inspection stations.

10. The machine as in claim 1, wherein the components of inhalers comprises cartomizers for electronic cigarettes.

11. A method for automatic treatment of components of inhalers, wherein each component comprises a central body of a tubular shape and having a lower end part normally protected by a removable lower cap and an upper end part normally protected by a removable upper cap, said method comprising:

loading said components onto a transporting member in a loading station;

transferring, via the transporting member, said components firstly to one or more work stations and/or to one or more inspection stations, and then to an unloading station;

removing said lower and upper caps from the central bodies of said components at a removal station disposed downstream of said loading station and upstream of said one or more work stations and/or one or more inspection stations; and repositioning, respectively, the removed lower and upper caps at the lower and upper end part of the central bodies of each of said components, at a repositioning station disposed downstream of said one or more work stations and/or one or more inspection stations and upstream of said unloading station, wherein a controller is configured to control the removal station to remove said removable lower and upper caps from the central bodies of said components and also configured to control the repositioning station to reposition, respectively, the removed lower and upper caps at the lower and upper end part of the central bodies of each of said components.

12. The method as in claim 11, wherein the components of inhalers comprises cartomizers for electronic cigarettes.

\* \* \* \* \*